US010354134B1

(12) United States Patent
Becker et al.

(10) Patent No.: US 10,354,134 B1
(45) Date of Patent: Jul. 16, 2019

(54) FEATURE CLASSIFICATION WITH SPATIAL ANALYSIS

(71) Applicant: INTUIT INC., Mountain View, CA (US)

(72) Inventors: Richard J. Becker, Edmonton (CA); Greg Coulombe, Edmonton (CA)

(73) Assignee: INTUIT, INC., Mountain View, CA (US)

( * ) Notice: Subject to any disclaimer, the term of this patent is extended or adjusted under 35 U.S.C. 154(b) by 127 days.

(21) Appl. No.: 15/688,312

(22) Filed: Aug. 28, 2017

(51) Int. Cl.
*G06K 9/00* (2006.01)
*G06K 9/46* (2006.01)
*G06K 9/50* (2006.01)

(52) U.S. Cl.
CPC ..... *G06K 9/00456* (2013.01); *G06K 9/00483* (2013.01); *G06K 9/4671* (2013.01); *G06K 9/50* (2013.01)

(58) Field of Classification Search
CPC .......... G06K 9/00456; G06K 9/00483; G06K 9/4671; G06K 9/50
See application file for complete search history.

(56) References Cited

U.S. PATENT DOCUMENTS

| | | | |
|---|---|---|---|
| 2002/0076107 A1* | 6/2002 | Loce | G06K 9/00456 382/209 |
| 2013/0039591 A1* | 2/2013 | De Muelenaere | G06K 9/44 382/224 |

* cited by examiner

*Primary Examiner* — Phuoc Tran
(74) *Attorney, Agent, or Firm* — Patterson + Sheridan, LLP

(57) ABSTRACT

Methods, non-transitory computer-readable storage mediums and systems for classifying features including labels or fields in digital images of forms and identifying any unclassified features utilizing a bitmap approach are provided. Each spatial template includes a set of features and a set of bitmaps, each bitmap indicating a spatial relationship between each feature and respective remaining features in each spatial template. The operations include selecting a spatial template from the spatial templates, classifying each extracted feature as one of features in the spatial template. The operations include generating at least one bitmap representing a spatial relationship for each unclassified feature in relation to classified features, comparing the at least one bitmap with each of a set of bitmaps in the selected spatial template, and identifying the at least one unclassified feature as one of features in the spatial template based on a result of the comparison.

20 Claims, 6 Drawing Sheets

FEATURE CLASSIFICATION WITH SPATIAL ANALYSIS

BACKGROUND

Field

The present disclosure generally relates to generating spatial templates, classifying features including labels or fields in digital images of forms according to a spatial template, and identifying any unclassified features in the digital images of forms by comparing a spatial relationship between each unclassified feature and classified features in the digital images of forms with a spatial relationship between features in the spatial template.

Related Art

Forms are often used to collect, register, or record certain types of information about an entity (e.g., a person or a business), a transaction (e.g., a sale), an event (e.g., a birth), a contract (e.g., a rental agreement), or some other matter of interest. A form typically contains fields or sections for specific types of information associated with the subject matter of the form. A field is typically associated with one or more labels identifying the type of information that should be found in the field. In order to make information more readily accessible or electronically searchable, individuals, businesses, and governmental agencies often seek to digitize text found on paper forms. Optical character recognition (OCR) techniques are generally used to convert images of text into computer-encoded text.

Labels and fields generally allow desired information to be located quickly and unambiguously when a form is inspected. Thus, when a paper form is digitized, it can be useful to identify labels and fields within the digitized form. However, categorizing these labels and fields can be a difficult and error-prone problem for reasons such as noise or low resolution. Thus, there is a need to provide techniques for classifying features (e.g., labels and fields) in digital images of forms and identifying any unclassified features in a high speed and accurate manner.

SUMMARY

In one aspect, a method for identifying features in a digital image comprises accessing a storage storing a set of spatial templates, each spatial template including a set of features and a set of bitmaps, each bitmap indicating a spatial relationship between each feature and respective remaining features in each spatial template; in response to receiving the digital image to be processed, selecting a spatial template from the set of spatial templates; segmenting the digital image into image segments; extracting features from each image segment; classifying each of the extracted features as one of the set of features in the spatial template; in response to at least one feature being unclassified, generating at least one bitmap representing a spatial relationship for each of the at least one unclassified feature in relation to classified features; comparing the at least one bitmap with each of a set of bitmaps in the selected spatial template; and identifying the at least one unclassified feature as one of the set of features in the selected spatial template based on a result of the comparison.

In another aspect, a non-transitory computer-readable storage medium containing instructions that, when executed by one or more processors, perform operations for classifying features in a digital image, the operations comprises accessing a storage storing a set of spatial templates, each spatial template including a set of features and a set of bitmaps, each bitmap indicating a spatial relationship between each feature and respective remaining features in each spatial template; in response to receiving the digital image to be processed, selecting a spatial template from the set of spatial templates; segmenting the digital image into image segments; extracting features from each image segment; classifying each of the extracted features as one of the set of features in the spatial template; in response to at least one feature being unclassified, generating at least one bitmap representing a spatial relationship for each of the at least one unclassified feature in relation to classified features; comparing the at least one bitmap with each of a set of bitmaps in the selected spatial template; and identifying the at least one unclassified feature as one of the set of features in the selected spatial template based on a result of the comparison.

In another aspect, a system comprises one or more processors; and a memory storing one or more applications, which, when executed on the one or more processors perform operations for identifying form fields in a digital image, the operations comprising: classifying features in a digital image, the operations comprising: creating a set of spatial templates, each spatial template including a set of features and a set of bitmaps, each bitmap indicating a spatial relationship between each feature and respective remaining features in each spatial template; in response to receiving the digital image to be processed, selecting a spatial template from the set of spatial templates; segmenting the digital image into image segments; extracting features from each image segment; classifying each of the extracted features as one of the set of features in the spatial template; in response to at least feature being unclassified, generating at least one bitmap representing a spatial relationship for each of the at least one unclassified feature in relation to classified features; comparing the at least one bitmap with each of a set of bitmaps in the selected spatial template; and identifying the at least one unclassified feature as one of the set of features in the selected spatial template based on a result of the comparison.

BRIEF DESCRIPTION OF THE DRAWINGS

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

In order to make information more readily accessible and searchable, individuals, businesses, and governmental agencies often digitize paper forms. For example, the Internal Revenue Service (IRS) may wish to digitize tax forms (e.g., 1040, W2, 1098-T, or 1099-MISC) submitted on paper so that information from the tax forms can be inspected for errors by an automated process. In another example, a law firm may digitize a large number of paper forms received in response to a discovery request so that the documents can be electronically searched for certain keywords. In another example, a web-based genealogical research company may wish to digitize a large number of death certificates in order to make information from the death certificates electronically searchable for customers.

Forms are often used to collect, register, or record certain types of information about an entity (e.g., a person or a business), a transaction (e.g., a sale), an event (e.g., a birth), a contract (e.g., a rental agreement), or some other matter of interest. A form typically contains fields or sections for specific types of information associated with the subject matter of the form. A field is typically associated with one or more labels identifying the type of information that should be found in the field. For example, a W2 form contains a field with the label "employee's social security number" in which an employee's social security number is entered. In another example, a death certificate typically contains at least one field that is associated with the label name (e.g., "first name" or "last name") in order to identify the deceased person to whom the certificate applies. In another example, a paper receipt typically has a labeled field indicating a total amount due for a transaction for which the receipt was issued. A field may refer to an area designated for providing a certain type of information. A text box, an underlined region, a radio button, a check box, or a blank space identifiable based on proximity to a label can all be considered examples of fields for the purposes of the disclosure.

Figure 1:
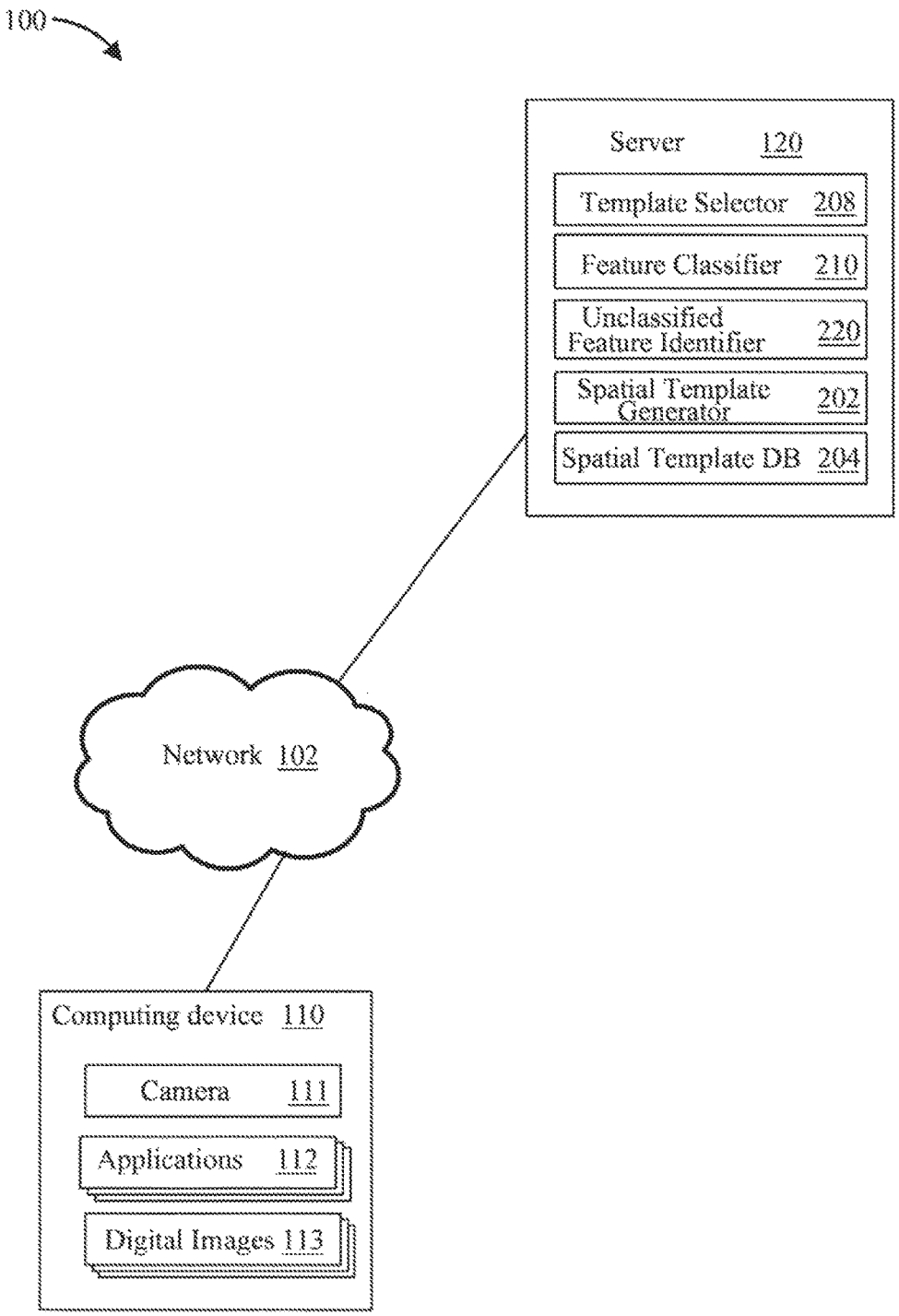
FIG. 1 illustrates an exemplary computing environment that may be used to apply techniques of the present disclosure.

FIG. 1 illustrates a computing environment 100 that may be used to apply techniques of classifying features including labels and/or fields in digital images of forms, and identifying any unclassified features in the digital image by comparing a spatial relationship between each unclassified feature and classified features in the digital images of forms with a spatial relationship between features in a template. A computing device 110 and a server 120 communicate via a network 102. As shown, the computing device 110 includes a camera 111. In addition, the computing device 110 is shown executing applications 112. A user obtains a digital image using the camera 111. One of the applications 112 can send the digital images 113 to the server 120. In an alternative embodiment, a scanner may be used in place of the camera 111.

As shown, the server 120 includes a template selector 121, feature classifier 122 and unclassified feature identifier 123. The template selector 121 selects a spatial template that matches a digital image to be processed, among a set of spatial templates.

The feature classifier 210 can segment the digital image, extract features from image segments, and classify the image segments based on the extracted features. The feature classifier 210 can classify each image segment as a certain type of field or label in the selected spatial template. If there are any features that have not been classified at the feature classifier 210, the unclassified feature identifier 220 generates a bitmap representing a spatial relationship between an unclassified feature and classified features for each of the unclassified features. The bitmap will be discussed in more detail below with respect to FIG. 4.

The feature classifier 210 can further include an optical character recognition (OCR) module to extract text from the image segments. The OCR module can improve accuracy by taking the classifications for the image segments into account when extracting the text.

While the server 120 is depicted as a single server, it should be understood that techniques of the present disclosure can be applied in a cloud-based scheme using multiple physical or virtual computing resources. The template generator 202, template selector 208, feature classifier 210, unclassified feature identifier 220 and template database 204 can be distributed across different computing resources as part of a cloud-based computing system.

The computing device 110 is included to be representative of a variety of devices, such as a mobile device, a cellular phone, a smart phone, a tablet, a laptop computer, a desktop computer, a personal digital assistant (PDA), or any computing system that can execute software applications.

Figure 2:
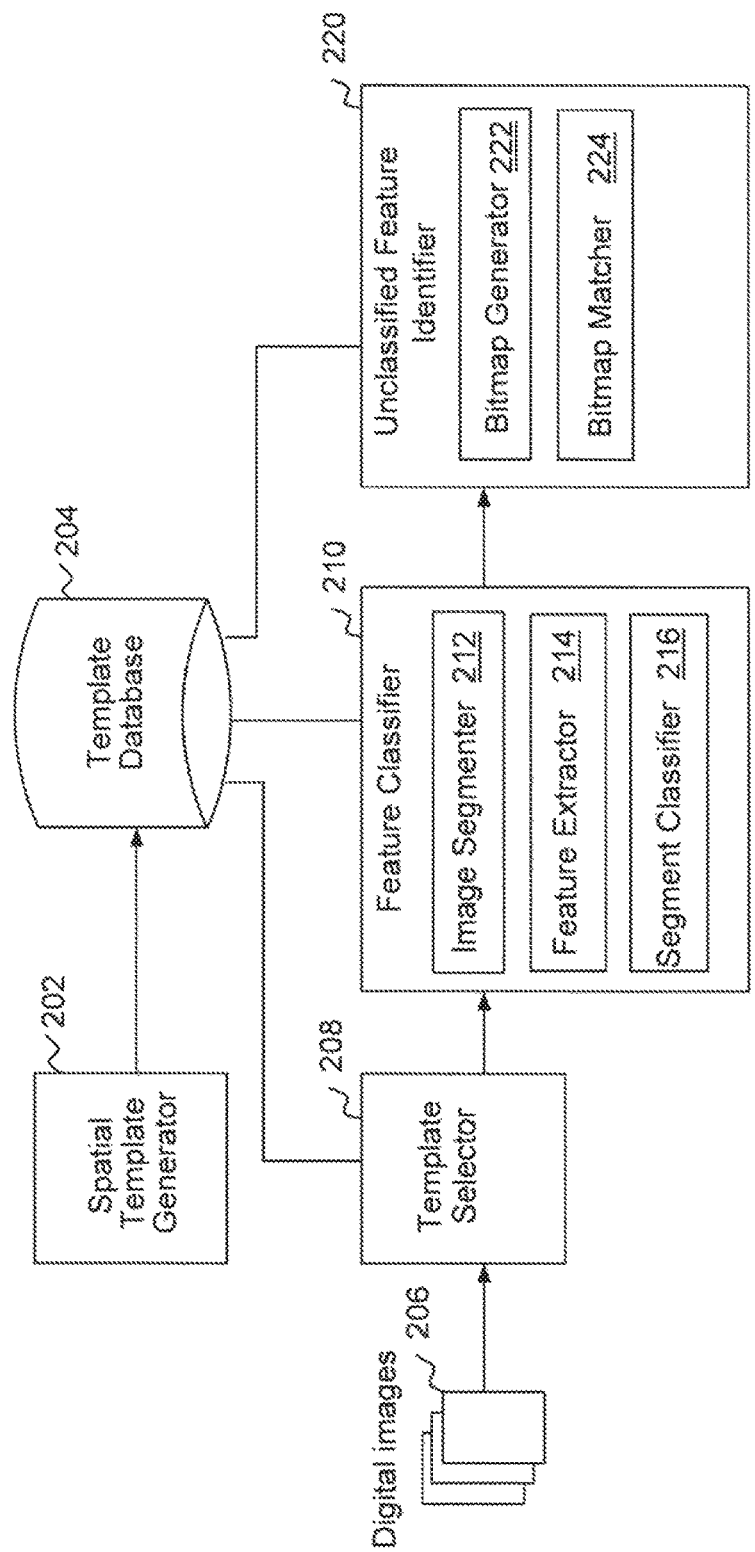
FIG. 2 further illustrates an exemplary schematic diagram of a feature classifier in accordance with aspects of the present disclosure.

FIG. 2 further illustrates the server 120 shown in FIG. 1 in accordance with aspects of the present disclosure. The server 120 can include a spatial template generator 202 that generates a set of spatial templates, each spatial template including a set of features and descriptions of the spatial relationship between the features. The set of spatial templates can be stored to the spatial template database 204.

The server 120 can further include a template selector 208, feature classifier 210, unclassified feature identifier 220. The template selector 208 receives a digital image(s) to be processed, and searches the spatial template database 204 to select a spatial template that is most fit to each digital image.

The feature classifier 210 includes an image segmenter 212, a feature extractor 214, and a segment classifier 216. When a digital image is received at the feature classifier 210, the digital image is processed by the image segmenter 212. For example, the image segmenter 212 may segment the digital image into image segments using computer-vision techniques.

In computer vision, image segmentation generally refers to the process of partitioning a digital image into multiple segments, wherein a segment is a set of pixels. Image segmentation is often used to locate objects and boundaries (e.g., lines and gaps.) in images. Image segmentation methods often incorporate, for example, edge detection, corner or interest-point detection, or blob detection.

The image segments can then be provided to the feature extractor 214. For each image segment, the feature extractor 214 can extract a set of features. The set features for a given image segment can be extracted using a variety of computer-vision techniques. The segment classifier 216 can use the set of features to classify the given image segment as a certain type of field or label contained in the spatial template.

Image segmenter 212 can also perform feature extraction while segmenting the digital image and may even use some of the same feature extraction techniques that are used by the feature extractor 214. The image segmenter 212 may extract features for the entire digital image and use those features to partition the digital image 206 into the image segments. The feature extractor 214, by contrast, may extract features separately for each individual image segment and provide each image segment's respective features as an input instance to the segment classifier 216.

If there are any features that have not been classified at the feature classifier 210, then these unclassified features are moved to the unclassified feature identifier 220 for further classification. The unclassified feature identifier 220 includes a bitmap generator 222 and a bitmap matcher 224. The bitmap generator 222 generates a bitmap representing the spatial relationship for each unclassified feature in relation to the list of classified features. The bitmap matcher 224 compares the bitmap for the unclassified feature with each bitmap for the set of features in the spatial template, and identifies a certain feature in the spatial template, whose bitmap best matches the bitmap for the unclassified feature.

Figure 3:
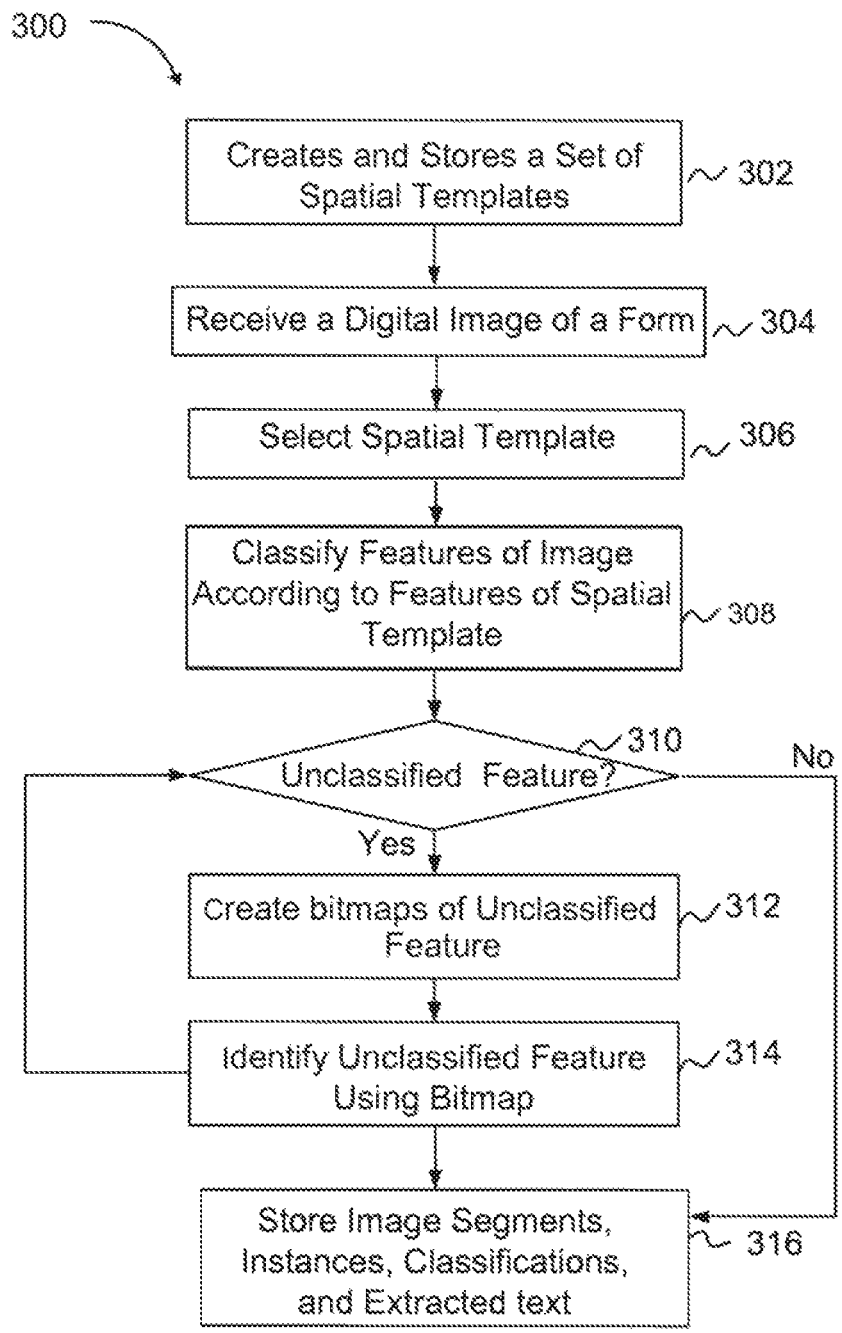
FIG. 3 illustrates an exemplary flowchart for classifying features in a digital image of a form and identifying unclassified features in accordance with aspects of the present disclosure.

FIG. 3 illustrates an exemplary flowchart for a feature classifier 300 in accordance with aspects of the present disclosure. FIG. 3 illustrates the functionality and operation of possible implementations of systems, methods and computer program products according to various embodiments of the present disclosure. In this regard, each block in the flowchart may represent a module, segment, or portion of code, which comprises one or more executable instructions for implementing the specified logical function(s). In some alternative implementations, the functions noted in the block may occur simultaneously, substantially concurrently, or out of the order noted in the figure. Each block of the flowchart and combinations of blocks in the flowchart can be implemented by special-purpose hardware-based systems that perform the specified functions or acts, or combinations of special purpose hardware and computer instructions.

At block 302, the processors generate a set of spatial templates that covers the range of forms or documents that may be encountered during the feature classification process. In one embodiment, the specific range of forms or documents to be covered by the set of spatial templates can be determined based on an input from an application developer. Once the set of spatial templates has been generated, they can be stored in the template database.

Each spatial template can include a set of features and descriptions of the spatial relationship between the features. The features can include labels, fields, markers, and/or ancillary texts. The features also can include edges, corners, interest points, blobs, regions of interest, ridges and many others. The spatial templates may be stored in a template database.

Figure 4:
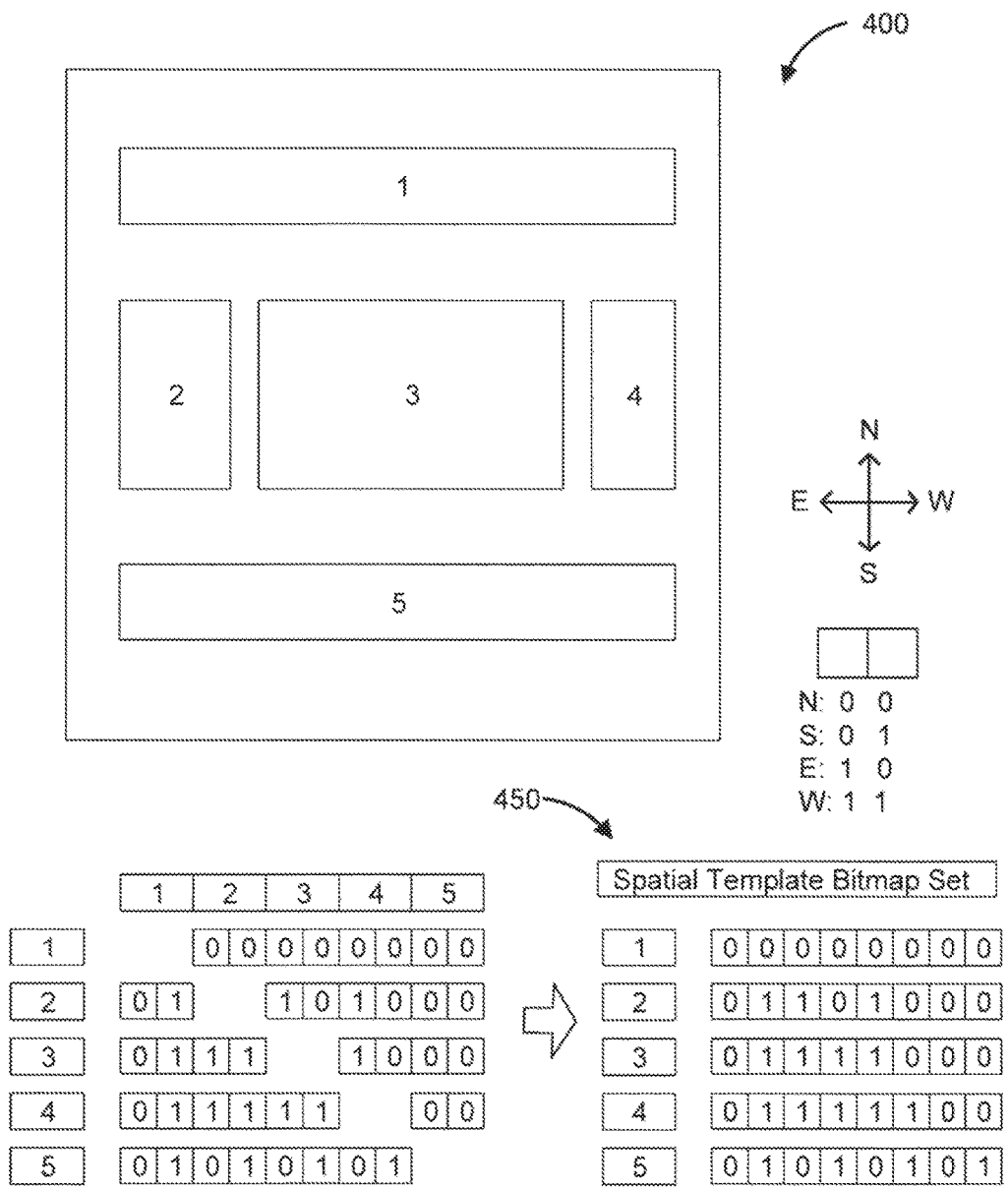
FIG. 4 illustrates one example of a spatial template in accordance with aspects of the present disclosure.

An example of a spatial template in accordance with aspects of the present disclosure is illustrated in FIG. 4. The spatial template 400 includes a set of features 1 to 5, and descriptions of a spatial relationship between the set of features 1 to 5. The descriptions of the spatial relationship can comprise a list of bitmaps 450, each bitmap representing a spatial relationship for each feature in relation to respective remaining features in the spatial template.

A bitmap comprises a combination of multi-bits. Each multi-bit can be used to indicate a spatial relationship for one feature in relation to another feature in the spatial template. A combination of these multi-bits is used to indicate a spatial relationship for one feature in relation to all of the other features in the spatial template.

In at least one example, two bits are used to describe the spatial relationship for one feature in relation to another feature. For example, the spatial relationship can be expressed by the points of a compass. In the case of two bits being used per spatial relationship between two features, for example, 00, 01, 10 and 11 can be mapped to north (N), south (S), east (E), and west (W), respectively. As shown in FIG. 4, feature 2 is located south of feature 1 (bits of 01), east of features 3 and 4 (bits of 1010), and north of feature 5 (bits of 00). Compiling all these bits, feature 2 has a bitmap of 01101000. Similarly, feature 1 has a bitmap of 000000, feature 3 has a bitmap of 0111000, feature 4 has a bitmap of 01111100 and feature 5 has a bitmap of 01010101. As a result, the spatial template 400 includes the list of bitmaps 450.

Alternatively, more than two bits can be used to indicate more accurate directions, such as NE, NW, SE, SW, NNW, WNW, WSW, SSW, SSE, ESE, ENE, NNE, and so on. In another example, each multi-bit can be used to describe an angle between one feature in relation to another feature. In yet another example, each multi-bit can be used to describe a vector with a magnitude and direction. In case of using a vector for describing a spatial relationship, some bits can indicate a magnitude component of the vector, and other bits can indicate a direction component of the vector.

To obtain each spatial template, the processors can extract multiple features from an exemplary form, and analyze the spatial relationships between the multiple features on the exemplary form as a pre-cursive operation.

At operation 304, the processors receive a digital image of a form to be processed from a memory, various I/O devices via the I/O device interfaces 604, and/or various external sources via the network 102. The digital image may have been taken using a digital camera, a scanner, or other OCR data streams. The form can be, for example, a tax form such as a W-2, a 1099-MISC, a 1098-T, or a 1040. The form may have been printed on paper before the image was taken. The image can be in a raster format such as Joint photographic Experts Group (JPEG), Tapped Image File Format (TIFF), Graphics Interchange Format (GIF), Bitmap (BMP), or Portable Network Graphics (PNG). Alternatively, the image can be in a vector format such as Computer Graphics Metafile (CGM) or Scalable Vector Graphics (SVG). The digital image may be in color, grayscale, or black and white.

At operation 306, the processors select a spatial template matching the digital image, from the set of spatial templates. For selecting a spatial template, the processors can access the spatial template database 204, and compare each of the set of spatial templates with the digital image of a form. In a specific implementation, the processors can utilize one of any well-known methods, such as a convolution network or a fingerprint recognition algorithm for the selection process.

In another embodiment, the processors can extract or detect features from the digital image, and compare the extracted features between the digital image and each of the set of spatial templates to find a match. It would be best to select a spatial template that exactly matches the digital image of a form. However, it should be noted that the selection process does not necessarily need a perfect match, but an approximate match is also sufficient. Alternatively, the selection process can adopt any other suitable methods to select a spatial template for the received document among the spatial templates.

At operation 308, the processors assign classifications for the features of the digital image according to the selected spatial template.

The processors segment the digital image document using multiple segmentation methods. Some image segmentation methods that may be used include techniques based on line boundaries, whitespace boundaries, thresholding, clustering, compression, histograms, edge detection, region growing, graph partitioning, and watershed transformation. Each of the multiple segmentation methods can demarcate a number of image segments that are found in the image. In some embodiments, the multiple image segmentations may execute in parallel using multiple copies of the image.

The processors extract or detect features from each image segment. The feature(s) may be extracted or detected using one or more computer-vision feature-extraction techniques. The extracted feature(s) can serve as a representation of each image segment. The system can calculate a centroid for each extracted feature. If one of the extracted features includes text, the processors can normalize the text.

Subsequently, the processors assign a classification for each image segment based on similarity between the extracted feature(s) of image segment and features of the selected spatial template. For example, the processors can calculate similarity between the normalized text in the digital image and features such as labels, markers or ancillary text in the spatial template. In another embodiment, the similarity between features of the image segment and spatial template can be calculated by modifying various techniques including e.g., edit distance, and Jaro-Winkler such that they are applicable to the features on an image segment and spatial template. Then, a classification with a higher-than-a-threshold similarity can be assigned for each image segment or extracted features. If an image segment meets a higher-than-a-threshold similarity to more than one feature in a spatial template, the processors can classify the image segment as the feature with a higher similarity.

If a feature of an image segment does not meet a threshold similarity to any features in the spatial template because of various reasons, such as low resolution, improper scan, and/or noise, then the processors will not assign a classification for the feature of the image segment. A threshold similarity can be adjusted in various examples.

In another embodiment, the features extracted from the image segment can be evaluated by the one or more machine-learning models. The one or more machine-learning models can then output a classification for extracted features in the image segment. The classification may identify each image segment as a particular type of label or field that contains a particular type of information.

At operation 310, the processors determine whether there is any unclassified feature in the digital image once the classification operation 308 is finished. If there is any unclassified feature after the classification operation 308, the processors proceed to operation 312 for identifying unclassified features based on a bitmap approach which produces accurate results with a high speed. If there is no unclassified feature, the processors proceed to operation 316 to store the classifications and identifications for further process.

At operation 312, the processors generate a bitmap representing the spatial relationship for each unclassified feature in relation to the classified features. The classified features refer to features that have been classified at the classification operation 308, and the unclassified features refer to features that have failed to be classified at the classification operation 308. The classified features can include labels, fields, markers or ancillary text and many others.

As similarly discussed in the spatial templates, a bitmap for each unclassified feature is composed of a combination of multi-bits, and indicates a spatial relationship between each unclassified feature in relation to the classified features.

Figure 5:
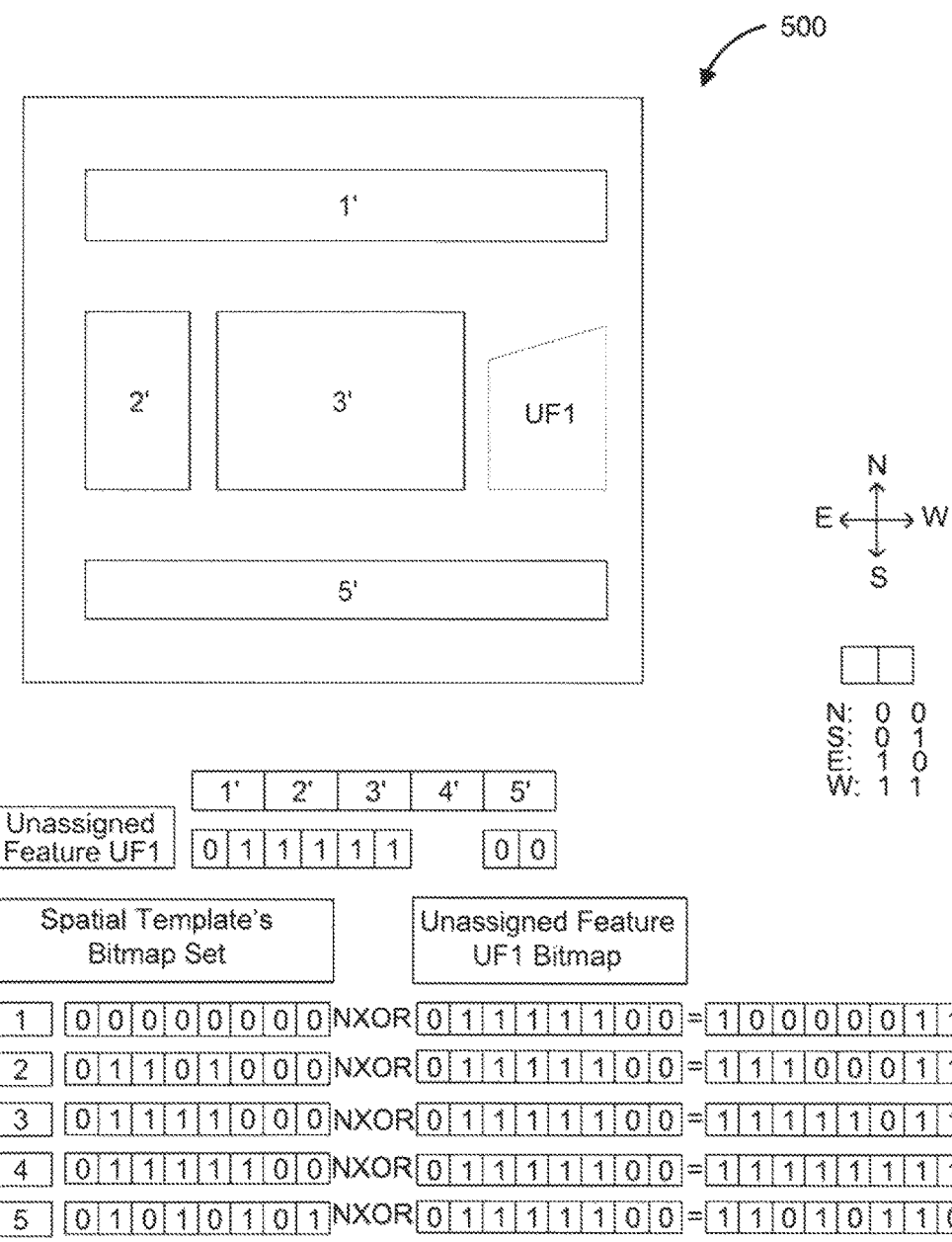
FIG. 5 illustrates one example of a digital image of a form in accordance with aspects of the present disclosure.

An example of a digital image of a form in accordance with aspects of the present disclosure is illustrated in FIG. 5. As shown, the digital image 500 includes five features 1', 2', 3', 4' and 5'. It is assumed that classification operation 308 found that feature 1' has a higher-than-a-threshold similarity to feature 1, feature 2' has a higher-than-a-threshold similarity to feature 2, feature 3' has a higher-than-a-threshold similarity to feature 3, feature 5' has a higher-than-a-threshold similarity to feature 5. However, UF 1' does not meet a threshold similarity to any features in the spatial template. As a result, the classification operation 308 respectively classifies features 1', 2', 3' and 5' as features 1, 2, 3 and 5 in the spatial template 400, however, does not classify feature UF1. It should be noted that the classification operation 308 can utilize any suitable classification methods, and different classification methods can adopt different criteria/thresholds for classifying the features.

In operation 310, the processors determine whether there is any unclassified feature when the classification operation 308 is finished. Once the classification operation 308 is complete with at least one feature left unclassified, the processors initiate the identification process for identifying each unclassified feature by using a spatial relationship between each unclassified feature and the classified features. In the embodiment illustrated in FIG. 5 as an example, UF1 remains as an unclassified feature after completion of the classification operation 308, while the features 1', 2', 3' and 5' are classified. Then, the processors start the identification process for identifying the unclassified feature UF1 by using a spatial relationship between the unclassified feature UF1 and the classified features 1', 2', 3' and 5'.

In operation 312, the processors generate a bitmap representing the spatial relationship for each unclassified feature in relation to the classified features. A bitmap comprises a combination of multi-bits, and each multi-bit can be used to describe a spatial relationship for each unclassified feature in relation to classified features.

A bitmap for each unclassified feature is generated in a manner similar to the generation of the bitmaps for spatial templates as described in operation 304 and FIG. 4. Referring back to the embodiment illustrated in FIG. 5, the processor generates a bitmap for the UF1 to describe a spatial relationship with the classified features 1', 2', 3' and 5'. Specifically, the unclassified feature UF1 is located south of feature 1' (bits 01), west of features 3' and 4' (bits 1010), and north of feature 5' (bits 00). Compiling all these bits results in a bitmap of 01111100 for the unclassified feature UF1. Although the above embodiment uses two bits to describe the spatial relationship for each unclassified feature in relation to classified features, it is obvious that more than two bits can be used to describe a more accurate direction, angle, or vector for each unclassified feature in relation to classified features.

Subsequently, the processors compare the generated bitmap of the unclassified feature with each of a set of bitmaps in the spatial template, and identifies a certain feature in the spatial template whose bitmap best matches a bitmap of the unclassified feature in operation 314.

For scoring a match, the processors perform not-exclusive-or (NXOR) operations between the bitmap for the unclassified feature and each bitmap for the set of features in the spatial template, and identify a certain feature in the spatial template for the unclassified feature, in which an NXOR operation between the bitmap of the certain feature and the bitmap for unclassified feature produces a resultant bitmap with a maximum number of '1' bits. In the embodiment illustrated in FIG. 5, the NXOR operation between the bitmap for feature 4 and the bitmap for unclassified feature UF1 produces 111111, which has the most number of '1' bits. As a result, the processors can identify the unclassified feature UF1 as feature 4 in the spatial template.

The processors loop the operations 310 and 312 for each of the unclassified features. When there is no more unclassified feature, the processors store image segments, classifications, identifications and extracted features in a database in operation 316. Subsequently, the image segments and their classifications can then be provided to the OCR module. For each image segment, the OCR module can define a subset of textual characters that can be included therein based on the image segment's classification. The OCR module can then extract text from the image segment such that extracted characters are either constrained to be, or biased toward being, characters in the subset. Once the OCR process on the classified and identified features is complete, a large number of digital images of forms or documents are digitized, and information on the large number of digital images of forms or documents will be electronically searchable and processable according to customer's needs.

Figure 6:
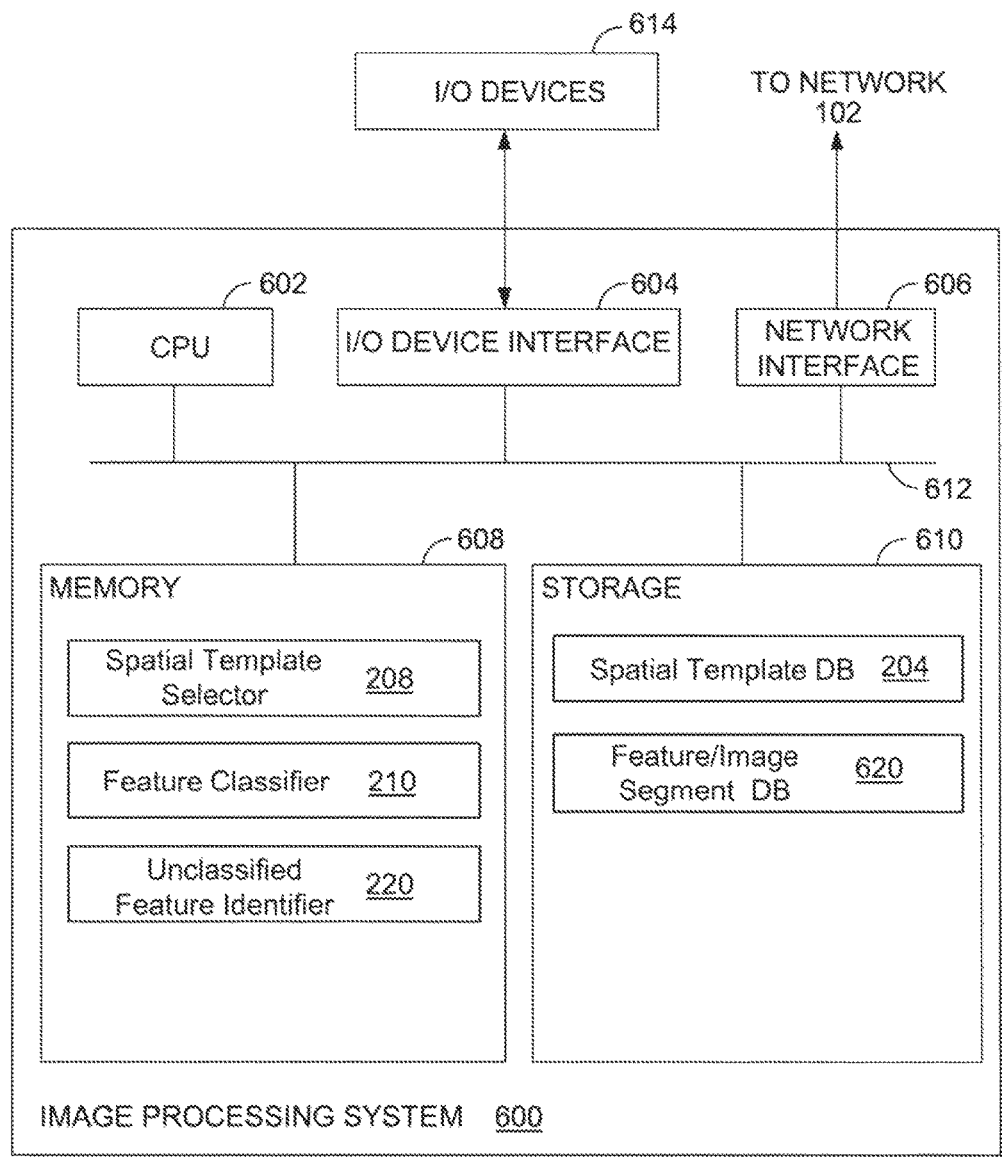
FIG. 6 illustrates an example image processing system for classifying features in a digital image of a form in accordance with aspects of the present disclosure.

FIG. 6 illustrates an example of an image processing system 600 that locates fields and labels in a digital image in accordance with aspects of the present disclosure. As shown, the image processing system 600 includes, without limitation, a central processing unit (CPU) 602, one or more I/O device interfaces 604 which may allow for the connection of various I/O devices (e.g., keyboards, displays, mouse devices, pen input, etc.) to the image processing system 600, network interface 606, memory 608, storage 610, and interconnect 612. The storage 610 can locate either inside or outside the image processing system 600. When the storage locates outside the image processing system 600, the storage can be connected via the network 102.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, the memory 608 stores programming instructions for executing the template selector 208, feature classifier 210 and unclassified feature identifier 220. In some embodiments, the memory 608 also stores programming instructions for executing the spatial template generator 202. The feature classifier 210 comprises the image segmenter 212, feature extractor 214, and segment classifier 216. The unclassified feature identifier 220 includes the bitmap generator 210 and bitmap matcher 224.

A digital image or a stream of digital images can be fed to the feature classifier 210 from the I/O devices or from another source, such as the network 102. In one embodiment, the image processing system 600 can be equipped with a scanner or camera, from which a digital image is acquired.

The image segmenter 212 can identify and separate image segments that are found within the digital image. The feature extractor 214 can, for each image segment, extract or detect a set of respective features. The segment classifier 216 can use the set of respective features for each image segment to assign a classification for the image segment. The classification can associate the image segment with a certain field type or label type.

As shown, storage 610 includes spatial template database 204 and feature/image segment database 620. It is noted that the storage 610 can be distributed across different computing resources as part of a cloud-based computing system.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for identifying features in a digital image, the method comprising:
   accessing a set of spatial templates, each spatial template including a set of features and a set of bitmaps, each bitmap indicating a spatial relationship between each feature and respective remaining features in each spatial template;
   in response to receiving the digital image to be processed, selecting a spatial template from the set of spatial templates;
   segmenting the digital image into image segments;
   extracting features from each image segment;
   classifying each of the extracted features as one of the set of features in the spatial template;
   in response to at least one feature being unclassified, generating at least one bitmap representing a spatial relationship for each of the at least one unclassified feature in relation to classified features;
   comparing the at least one bitmap with each of a set of bitmaps in the selected spatial template; and
   identifying the at least one unclassified feature as one of the set of features in the selected spatial template based on a result of the comparison.

2. The method of claim 1, wherein the set of features includes at least one of a label, field, marker or ancillary text.

3. The method of claim 1, wherein each bitmap comprises a combination of multi-bits, each multi-bit corresponding to a point of a compass defined between one feature and another feature.

4. The method of claim 1, wherein each bitmap comprises a combination of multi-bits, each multi-bit corresponding to a vector defined between one feature and another feature, wherein a first portion of a multi-bit indicates a magnitude component of the vector, and a second portion of the multi-bit indicates a direction component of the vector.

5. The method of claim 1, wherein comparing the at least one bitmap with each of a set of bitmaps comprises performing not-exclusive-or (NXOR) operations between the at least one bitmap and each of the set of bitmaps in the selected spatial template.

6. The method of claim 5, wherein comparing the at least one bitmap with each of a set of bitmaps further comprises:
   classifying the at least one unclassified feature as a certain feature in the spatial template when an NXOR operation with the certain feature produces a resultant bitmap with a maximum number of '1' bits.

7. The method of claim 1, further comprising creating the set of spatial templates and storing the set of spatial templates in the storage.

8. A non-transitory computer-readable storage medium containing instructions that, when executed by one or more processors, perform operations for classifying features in a digital image, the operations comprising:
   accessing a storage storing a set of spatial templates, each spatial template including a set of features and a set of bitmaps, each bitmap indicating a spatial relationship between each feature and respective remaining features in each spatial template;
   in response to receiving the digital image to be processed, selecting a spatial template from the set of spatial templates;
   segmenting the digital image into image segments;
   extracting features from each image segment;
   classifying each of the extracted features as one of the set of features in the spatial template;
   in response to at least one feature being unclassified, generating at least one bitmap representing a spatial relationship for each of the at least one unclassified feature in relation to classified features;
   comparing the at least one bitmap with each of a set of bitmaps in the selected spatial template; and
   identifying the at least one unclassified feature as one of the set of features in the selected spatial template based on a result of the comparison.

9. The non-transitory computer-readable storage medium of claim 8, wherein the set of features includes at least one of a label, field, marker or ancillary text.

10. The non-transitory computer-readable storage medium of claim 8, wherein each bitmap comprises a combination of multi-bits, each multi-bit corresponding to a point of a compass defined between one feature and another feature.

11. The non-transitory computer-readable storage medium of claim 8, wherein each bitmap comprises a combination of multi-bits, each multi-bit corresponds to a vector defined between one feature and another feature, wherein a first portion of a multi-bit indicates a magnitude component of the vector, and a second portion of the multi-bit indicates a direction component of the vector.

12. The non-transitory computer-readable storage medium of claim 8, wherein comparing the at least one bitmap with each of a set of bitmaps comprises performing not-exclusive-or (NXOR) operations between the at least one bitmap and each of the set of bitmaps in the selected spatial template.

13. The non-transitory computer-readable storage medium of claim 12, wherein comparing the at least one bitmap with each of a set of bitmaps further comprises:
   classifying the at least one unclassified feature as a certain feature in the spatial template when an NXOR operation with the certain feature produces a resultant bitmap with a maximum number of '1' bits.

14. A system, comprising:
   one or more processors; and
   a memory storing one or more applications, which, when executed on the one or more processors perform operations for identifying form fields in a digital image, the operations comprising:
   classifying features in a digital image, the operations comprising:
   creating a set of spatial templates, each spatial template including a set of features and a set of bitmaps, each bitmap indicating a spatial relationship between each feature and respective remaining features in each spatial template;
   in response to receiving the digital image to be processed, selecting a spatial template from the set of spatial templates;
   segmenting the digital image into image segments;
   extracting features from each image segment;
   classifying each of the extracted features as one of the set of features in the spatial template;
   in response to at least one feature being unclassified, generating at least one bitmap representing a spatial relationship for each of the at least one unclassified feature in relation to classified features;
   comparing the at least one bitmap with each of a set of bitmaps in the selected spatial template; and identifying the at least one unclassified feature as one of the set of features in the selected spatial template based on a result of the comparison.

15. The system of claim 14, wherein the set of features includes at least one of a label, field, marker or ancillary text.

16. The system of claim 14, wherein each bitmap comprises a combination of multi-bits, each multi-bit corresponding to a point of a compass defined between one feature and another feature.

17. The system of claim 14, wherein each bitmap comprises a combination of multi-bits, each multi-bit corresponding to a vector defined between one feature and another feature, wherein a first portion of a multi-bit indicates a magnitude component of the vector, and a second portion of the multi-bit indicates a direction component of the vector.

18. The system of claim 14, wherein comparing the at least one bitmap with each of a set of bitmaps comprises performing not-exclusive-or (NXOR) operations between the at least one bitmap and each of the set of bitmaps in the selected spatial template.

19. The system of claim 18, wherein comparing the at least one bitmap with each of a set of bitmaps further comprises:
classifying the at least one unclassified feature as a certain feature in the spatial template, in which an NXOR operation with the certain feature produces a resultant bitmap with a maximum number of '1' bits.

20. The system of claim 14, further comprising a storage configured to store the set of spatial templates.

* * * * *